3,462,422
17 - OXYGENATED ANDROSTA/ESTRA-4,6,8(14)-TRIEN - 3 - ONES, DIHYDRO CONGENERS, AND INTERMEDIATES
William F. Johns, Morton Grove, Ill., assignor to G. D. Searle & Co., Chicago, Ill., a corporation of Delaware
No Drawing. Filed Sept. 26, 1966, Ser. No. 581,701
Int. Cl. C07c *169/10, 169/22, 173/00*
U.S. Cl. 260—239.55   12 Claims

ABSTRACT OF THE DISCLOSURE

Preparation of 17-oxygenated androsta/estra-4,6,8(14)-trien-3-ones such as 17β-hydroxyestra-4,6,8(14)-trien-3-one, dihydro congeners thereof, and intermediates thereto having valuable biological properties including anti-DCA and anti-protozoal activity is disclosed.

---

This invention relates to 17-oxygenated androsta/estra-4,6,8(14)-trien-3-ones and dihydro congeners, intermediates thereto, and processes for the preparation thereof. More particularly, this invention provides new, useful, and unobvious steroids of the formulas

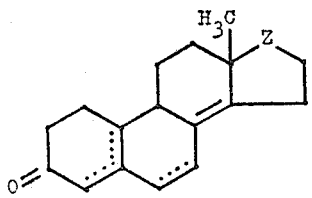

and

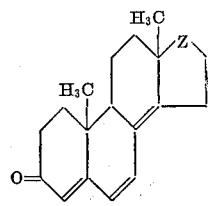

wherein Z represents a carbonyl, β-hydroxymethylene, β-hydroxy-α-ethynylmethylene, or β-hydroxy-α-(lower alkyl)-methylene radical and the dotted lines indicate that the compounds of Formula I are $\Delta^4$, $\Delta^{5(10)}$, or $\Delta^{4,6}$, in addition to being $\Delta^{8(14)}$ as shown by the solid line in ring C.

Those skilled in the art will recognize that β-hydroxy-α-ethynyl and β-hydroxy-α-(lower alkyl)methylene radicals are radicals of the formula

wherein R represents, respectively, an ethynyl grouping or a monovalent, saturated, acyclic, straight- or branched-chain, hydrocarbon grouping of the formula —$C_nH_{2n+1}$ in which n represents a positive integer less than 8. Typical lower alkyl groupings include methyl, ethyl, propyl, isopropyl, butyl, isobutyl, sec-butyl, tert-butyl, pentyl, neopentyl, hexyl, isohexyl, heptyl, and the like.

The compounds to which this invention relates are useful by reason of their valuable pharmacological properties. For example, they block the effects of desoxycorticosterone acetate on urinary sodium and potassium. They are also protozoa inhibitors effective, i.a., against *Tetrahymena gelleii*.

Preparation of the estrane derivatives (Formula I compounds) hereof proceeds by reducing an aniline solution of 3β-methoxyestra-1,3,5(10),8,14-pentaen-17β-ol [Chem. Pharm. Bull. (Tokyo), 13, 1285 (1965)] with sodium and liquid ammonia to give 3-methoxyestra-1,3,5(10),8(14)-tetraen-17β-ol, which in turn is reduced with lithium and liquid ammonia in tetrahydrofuran solution containing tert-butyl alcohol to give 3-methoxyestra-2,5(10),8(14)-trien-17β-ol. The hydroxymethylene grouping in the latter intermediate is oxidized to a carbonyl upon heating with aluminum isopropoxide and cyclohexanone in toluene, and the carbonyl is converted to a β-hydroxy-α-(lower alkyl)-methylene grouping upon contact with (lower alkyl)magnesium bromide in tetrahydrofuran containing diethyl ether. Alternatively, the carbonyl is converted to a β-hydroxy-α-ethynylmethylene grouping by contacting with sodium acetylide in dimethylformamide. From the 17-oxygenated 3-methoxyestra-2,5(10),8(14)-trienes thus obtained

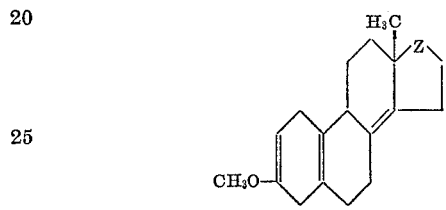

(Z being defined as before), upon brief contact with aqueous acetic acid, the 17-oxygenated estra-5(10),8(14)-dien-3-ones of this invention are obtained. Either the latter compounds, or their intermediate precursors aforesaid, upon prolonged contact with aqueous methanolic hydrogen chloride afford the 17-oxygenated estra-4,8(14)-dien-3-ones of the invention. The 17-oxygenated estra-4,8(14)-dien-3-ones hereof are converted to corresponding estra-4,6,8(14)-trien-3-ones by warming with 2,3,5,6-tetrachloro-1,4-benzoquinone (chloranil) in tert-butyl alcohol. Alternatively, and in somewhat improved yield, estra-4,6,8(14)-triene-3,17-dione is obtained from 17β-hydroxyestra-4,6,8(14)-trien-3-one by oxidizing the hydroxyl with chromium trioxide and sulfuric acid in acetonic medium.

The androstane derivatives (Formula II compounds) of this invention eventuate from 3β-acetoxyandrosta-5,7-dien-17-one [J. Org. Chem., 16, 1129 (1951)], which can be converted to a 17α-(lower alkyl)androsta-5,7-diene-3β,17β-diol by contacting with a (lower alkyl)magnesium bromide in tetrahydrofuran containing diethyl ether. Alternatively, the 3-acetoxyl can first be saponified with ethanolic potassium hydroxide and the carbonyl can thereupon be converted to a β-hydroxy-α-ethynylmethylene grouping by contacting with sodium acetylide in dimethylformamide. From the aforesaid 17-oxygenated androsta-5,7-dien-3β-ols

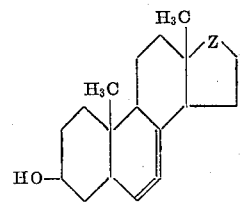

(Z being defined as before), sensitized by 2,4,5,7-tetrabromo - 9 - (o - carboxyphenyl) - 6 - hydroxy - 3H - xanthene-3-one disodium salt (eosin yellowish) and heated with oxygen in alcohol solution irradiated by light from an incandescent lamp, the corresponding 5,8-epidioxy-6-enes

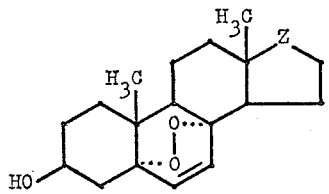

are obtained; and these, in turn, afford the corresponding androsta-4,6,8(14)-trien-3-ones

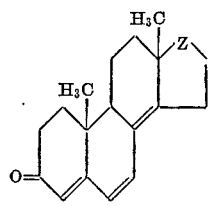

on prolonged contact with palladium black in an alcoholic medium. Alternatively, 5,8-epidioxy-5α,8α-androst-6-ene-3β,17β-diol is obtained by reducing 5,8-epidioxy-3β-hydroxy-5α,8α-androst-6-en-17-one with lithium tri-tert-butoxy aluminum hydride in tetrahydrofuran.

Certain of the compounds of this invention are obtained in the form of solvates wholly equivalent to corresponding non-solvated compounds for the purposes herein set forth.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

(A) 3-methoxyestra-1,3,5(10),8(14)-tetraen-17β-ol.—To a vigorously stirred solution of 22 parts of 3-methoxyestra-1,3,5(10),8,14-pentaen-17β-ol in 600 parts of aniline and approximately 4000 parts of liquid ammonia is added 20 parts of sodium. Stirring is continued thereafter for 30 minutes, whereupon 100 parts of ammonium chloride is mixed in; and the ammonia is thereupon removed by distillation. The residue is partitioned between ether and water. The ethereal phase is separated and consecutively washed with excess 5% hydrochloric acid, water, and aqueous 5% potassium bicarbonate, in that order. Solvent is removed from the extract by distillation; and the residue is consecutively crystallized from ether and a mixture of ether and hexane, using decolorizing charcoal in process. The product thus isolated is 3-methoxyestra-1,3,5(10),8(14)-tetraen-17β-ol melting at 75–78°.

(B) 3-methoxyestra-2,5(10),8(14)-trien-17β-ol.—A solution of 54 parts of 3-methoxyestra-1,3,5(10),8(14)-tetraen-17β-ol in 450 parts of tetrahydrofuran is added to a vigorously stirred mixture of 1360 parts of liquid ammonia and 400 parts of tert-butyl alcohol. Then, during 30 minutes, 10 parts of lithium wire is stirred in. Stirring is continued for 4 hours, at which point the blue color which develops has disappeared; and the ammonia is thereupon removed by distillation. The residue is partitioned between benzene and the water. The benzene phase is separated, dried over anhydrous sodium sulfate, and stripped of solvent by vacuum distillation. The residual oil is crystallized from benzene. Filtered off and washed with pentane, the material thus isolated is 3-methoxyestra-2,5(10),8(14)-trien-17β-ol containing solvent of crystallization and melting at 92–94°.

(C) 17β-hydroxy-4,8(14)-dien-3-one.—A solution of 30 parts of 3-methoxyestra-2,5(10), 8(14)-trien-17β-ol in 480 parts of methanol is mixed with approximately 48 parts of concentrated hydrochloric acid and 100 parts of water at 10°. The resultant mixture is stirred at room temperatures for 3 hours, then made slightly alkaline with aqueous 5% potassium hydroxide and finally extracted with benzene. The benzene extract is dried over anhydrous sodium sulfate and stripped of solvent by vacuum distillation. The residue is crystallized from ether, using decolorizing charcoal in process, to give 17β-hydroxyestra - 4,8(14) - dien-3-one melting at 138–141° The product has the formula

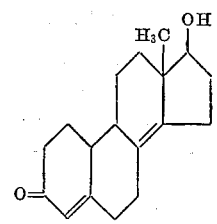

EXAMPLE 2

17β - hydroxyestra-4,6,8(14)-trien-3-one.—To a solution of 178 parts of 17β-hydroxyestra-4,8(14)-dien-3-one. in approximately 1600 parts of tert-butyl alcohol at 60° under nitrogen is added 78 parts of chloranil. The resultant mixture becomes homogeneous after 15 minutes at 60°. After 35 minutes, the reactants are cooled and diluted with 4 volumes of ether. The resultant solution is consecutively washed with aqueous 5% sodium sulfite and aqueous 5% potassium hydroxide, then distilled to dryness in vacuo. The foamy residue is crystallized from ether to give 17β - hydroxyestra - 4,6,8(14) - trien-3-one melting at approximately 157–158°. The product has the formula

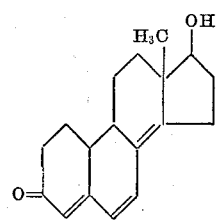

EXAMPLE 3

Estra - 4,6,8(14) - triene-3,17-dione.—To 10 parts of chromium trioxide dissolved in 55 parts of 27% sulfuric acid is added a solution of 36 parts of 17β-hydroxyestra-4,6,8(14)-trien-3-one in 1600 parts of acetone. The resultant mixture is stirred at room temperatures for 45 minutes, then diluted with approximately 80 parts of isopropyl alcohol and 2000 parts of water. The oil which separates is extracted with dichloromethane. The extract is stripped of solvent by vacuum distillation. The residue is estra-4,6,8(14)-triene-3,17-dione, having the formula

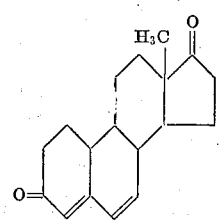

and which, crystallized from a mixture of ether and acetone, is obtained as the hemiacetone solvate melting at 220–225°.

EXAMPLE 4

(A) 3 - methoxyestra - 2,5(10),8(14) - trien - 17 - one.—Approximately 50 parts of solvent is distilled, under nitrogen, from a solution of 22 parts of 3-methoxyestra-2,5(10),8(14)-trien-17β-ol in a mixture of 95 parts of cyclohexanone and 720 parts of toluene. Boiling with agitation is then maintained under reflux while a solution of 12 parts of aluminum isopropoxide in approximately 110 parts of toluene is introduced during 15 minutes. Boiling with agitation is continued for 15 minutes, whereupon the reaction mixture is chilled and then diluted with 100 parts of aqueous 50% potassium sodium tartrate. The mixture thus obtained is steam distilled for 1 hour, then chilled. The distilland is extracted with benzene, and the benzene extract is dried over anhydrous sodium sulfate and stripped of solvent by vacuum distillation. The residue is crystallized from a mixture of ether and methanol, using decolorizing charcoal in process, to give 3-methoxyestra-2,5(10),8(14)-trien-17-one melting at 115–117°.

(B) Estra-4,8(14)-dien-17-one.—A solution of 4 parts of 3 - methoxyestra - 2,5(10),8(14)-trien-17-one in 160 parts of methanol, 30 parts of water, and 12 parts of concentrated hydrochloric acid is allowed to stand at room temperatures for 4 hours. The solution is then diluted with 3 volumes of water, precipitating a solid which, filtered off, dried in air, and recrystallized from aqueous acetone, affords estra-4,8(14)-dien-17-one melting at approximately 167–168°. The product has the formula

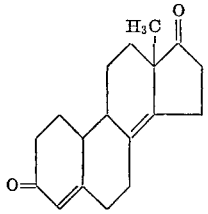

EXAMPLE 5

(A) 3 - methoxy-17α-methylestra-2,5(10),8(14)-trien-17β-ol.—To a stirred solution of 57 parts of methylmagnesium bromide in 560 parts of ether is added, during 15 minutes, a solution of 14 parts of 3-methoxyestra-2,5(10),8(14)-trien-17-one in a mixture of 90 parts of tetrahydrofuran and 210 parts of ether. The resultant mixture is allowed to stand for 21 hours, then consecutively diluted with an equal volume of water and sufficient 5% hydrochloric acid to dissolve the bulk of the precipitate which has formed. The mixture thus obtained is extracted with ether. The ether extract is dried over anhydrous sodium sulfate and stripped of solvent by vacuum distillation. The residue is 3-methoxy-17α-methylestra-2,5(10),8(14)-trien-17β-ol.

(B) 17β - hydroxy-17α - methylestra - 4,8(14)-dien-3-one.—A solution of 9 parts of 3-methoxy-17α-methylestra-2,5(10),8(14)-trien-17β-ol in 160 parts of methanol, 19 parts of concentrated hydrochloric acid, and 40 parts of water is allowed to stand at room temperatures for 3 hours, then partitioned between benzene and water. The benzene phase is separated and stripped of solvent by vacuum distillation. The residue is crystallized from a mixture of acetone and hexane to give 17β-hydroxy-17α-methylestra-4,8(14)-dien-3-one melting at 136–138°. The product has the formula

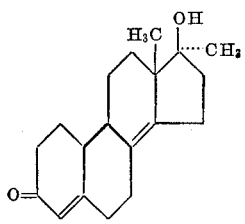

EXAMPLE 6

17β - hydroxy - 17α - methylestra-4,6,8(14)-trien-3-one hemihydrate.—To a solution of 3 parts of 17β-hydroxy-17α-methylestra-4,8(14)-dien-3-one in 48 parts of tert butyl alcohol at 55° under nitrogen is added 3 parts of chloranil. The temperature is maintained at 55° for 45 minutes, whereupon the reaction mixture is chilled and then partitioned between dichloromethane and aqueous 10% sodium sulfite. The dichloromethane layer is separated, consecutively washed with aqueous 2% potassium hydroxide and water, dried over anhydrous magnesium sulfate, and stripped of solvent by vacuum distillation. The residue is crystallized from anhydrous ether to give 17β - hydroxy-17α-methylestra-4,6,8(14)-trien-3-one, having the formula

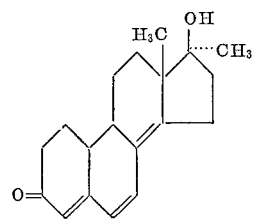

Recrystallization from aqueous acetone affords 17β-hydroxy-17α-methylestra-4,6,8(14)-trien-3-one as the hemihydrate melting at 164–166°.

EXAMPLE 7

17β - hydroxy-17α-methylestra-5(10),8(14) - dien - 3-one.—A mixture of 28 parts of 3-methoxy-17α-methylestra-2,5(10),8(14)-trien-17β-ol, 500 parts of acetic acid, and 100 parts of water is stirred at room temperatures for 25 minutes. After the first ten minutes, solution occurs At the close of the prescribed stirring period, 3 volumes of water is introduced, precipitating oily crystals. The crystalline material is filtered off, dried in air, and taken up in dichloromethane. The dichloromethane solution is washed with aqueous 5% potassium bicarbonate, dried over anhydrous sodium sulfate, and stripped of solvent by vacuum distillation. The residue is crystallized from a mixture of dichloromethane and hexane to give 17β-hydroxy-17α-methylestra-5(10),8(14)-dien-3-one melting at 127–130°. The product has the formula

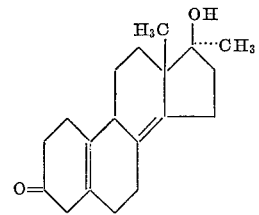

EXAMPLE 8

17α-ethynyl-3-methoxyestra-2,5(10),8(14)-trien - 17β-ol.—To a mixture of 952 parts of liquid ammonia, 560 parts of isopropyl alcohol, and 1 part of cupric nitrate is added, portionwise with agitation, 116 parts of sodium. A blue color develops. Agitation is continued until the color disappears, whereupon 1140 parts of dimethylformamide is introduced and the resultant solution warmed to 20° to distill off the ammonia. The distilland is saturated with acetylene consecutively pre-washed with water and concentrated sulfuric acid. A solution of 100 parts of 3-methoxyestra-2,5(10),8(14)-trien-17-one in 1900 parts of dimethylformamide is thereupon stirred in during 20 minutes while acetylene is passed over the surface of the reaction mixture. After a further 2 hours at 20°, stirring is discontinued and the reaction mixture is diluted with 2 volumes of ice-and-water. The resultant crystalline precipitate is filtered off, washed with water, and consecutively recrystallized from aqueous acetone and a mixture of ether and hexane, using decolorizing charcoal in process. The 17α-ethynyl-3-methoxyestra-2,5(10),8(14)-trien-17β-ol thus isolated melts at 138–142°.

(B) 17α - ethynyl - 17β - hydroxyestra - 4,8(14) - dien-3-one.—A solution of 32 parts of 17α-ethynyl-3-methoxyestra-2,5(10),8(14)-trien-17β-ol in a mixture of 640 parts of methanol, 60 parts of concentrated hydrochloric acid, and 80 parts of water is allowed to stand at room temperatures for 2½ hours. The solution is thereupon diluted with 3 volumes of water, precipitating a solid which is isolated by filtration, washed with water, and recrystallized from ether, using decolorizing charcoal in process. The product thus isolated is 17α-ethynyl-17β-hydroxyestra-4,8(14)-dien-3-one melting at 180–182°. It has the formula

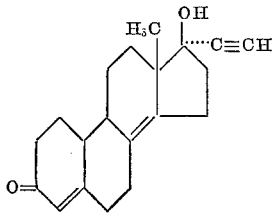

EXAMPLE 9

17α - ethynyl - 17β - hydroxyestra - 4,6,8(14) - trien - 3-one.—To a stirred solution of 165 parts of 17α-ethynyl-17β-hydroxyestra-4,8(14)-dien-3-one in 4800 parts of tert-butyl alcohol at 60° under nitrogen is added 150 parts of chloranil. Temperature is maintained at about 60° for 40 minutes, whereupon the reaction mixture is cooled and diluted with 3 volumes of ether. The resultant solution is consecutively washed with aqueous 5% sodium sulfite and aqueous 2% potassium hydroxide, then concentrated to incipient precipitation by vacuum distillation. Upon chilling, the precipitate which forms is filtered off and recrystallized from acetone to give 17α-ethynyl-17β-hydroxyestra-4,6,8(14)-trien-3-one melting at 218–220°. The product has the formula

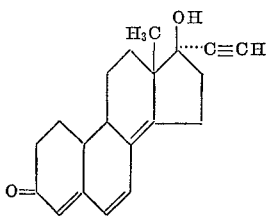

EXAMPLE 10

(A) 3β - acetoxy - 5,8 - epidioxy - 5α,8α - androst - 6-en-17-one.—During 7 hours, oxygen is bubbled through a solution of 106 parts of 3β-acetoxyandrosta-5,7-dien-17-one and 1 part of eosin yellowish in 6400 parts of absolute ethyl alcohol at the boiling point under reflux and illuminated by the light of a closely proximate 500-watt tungsten lamp. Approximately half of the solvent is thereupon removed by distillation, and the distilland is chilled. Insoluble solids thrown down are filtered off and recrystallized from a mixture of dichloromethane and methanol to give 3β-acetoxy-5,8-epidioxy-5α,8α-androst-6-en-17-one melting at 251–253°.

(B) 5,8 - epidioxy - 3β - hydroxy - 5α,8α - androst - 6-en-17-one.—A mixture of 126 parts of 3β-acetoxy-5,8-epidioxy-5α,8α-androst-6-en-17-one in 3200 parts of ethyl alcohol and 435 parts of aqueous 10% potassium hydroxide is stirred under nitrogen at room temperatures for 20 hours, then diluted with 30,000 parts of water. The precipitate thrown down is collected on a filter, dried in air, and recrystallized from a mixture of acetone and hexane to give 5,8-epidioxy-3β-hydroxy-5α,8α-androst-6-en-17-one melting at 200–202°.

(C) 5,8-epidioxy-5α-8α-androst-6-ene-3β,17β-idol.—To a stirred solution of 1 part of 5,8-epidioxy-3β-hydroxy-5α,8α-androst-6-en-17-one in 36 parts of tetrahydrofuran at approximately 5° is added 2 parts of lithium tri-tert-butoxy aluminum hydride. Stirring is continued for approximately 10 minutes, whereupon the reactants are warmed to room temperature and allowed to stand thereat for 2 hours, then poured into 2½ volumes of 5% acetic acid. The resultant mixture is freed of tetrahydrofuran by evaporation under nitrogen, and the residue is extracted with ethyl acetate. The ethyl acetate extract is consecutively washed with water and aqueous 5% potassium bicarbonate, dried over anhydrous magnesium sulfate, and freed of solvent by vacuum distillation. The residue thus obtained is crystallized from a mixture of acetone and hexane to give 5,8-epidioxy-5α,8α-androst-6-ene-3β,17β-diol melting at 125–127°, solidifying above this temperature, and melting again at 195–210°.

(D) 17β-hydroxyandrosta-4,6,8(14)-trien-3-one.—Approximately 2 parts of 5,8-epidioxy-5α-8α-androst-6-ene-3β-17β-diol and 10 parts of palladium black in 160 parts of absolute ethyl alcohol is stirred at room temperatures for 10 days. The reaction mixture is thereupon filtered, and the filtrate is stripped of solvent by vacuum distillation. The residue, chromatographed on silica gel using benzene and ethyl acetate as developing solvents, affords 17β-hydroxyandrosta-4,6,8(14)-trien-3-one. The product has the formula

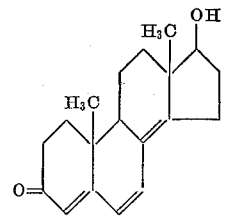

EXAMPLE 11

Androsta - 4,6,8(14) - triene - 3,17 - dione.—Approximately 2 parts of 5,8-epidioxy-3β-hydroxy-5α,8α-androst-6-en-17-one and 10 parts of palladium black in 160 parts of absolute ethyl alcohol is stirred at room temperatures for 10 days. The reaction mixture is thereupon filtered, and the filtrate is stripped of solvent by vacuum distillation. The residual oil is triturated with ether, affording a crystalline solid which, filtered off and recrystallized from a mixture of acetone and hexane, affords androsta-4,6,8(14)-triene-3,17-dione melting at 159–166°. The product has the formula

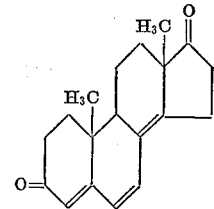

EXAMPLE 12

(A) 17α - methylandrosta-5,7-diene - 3β,17β - diol.—A solution of 35 parts of 3β-acetoxyandrosta-5,7-dien-17-one in 450 parts of tetrahydrofuran is added, with agitation, to approximately 36 parts of methyl magnesium bromide dissolved in approximately 1500 parts of ether. Agitation is continued for 20 hours, at which point an equal volume of water is mixed in and the reaction mixture thereupon acidified with 5% hydrochloric acid. Ether is then distilled off under nitrogen, and the precipitate which forms is filtered out and recrystallized from methanol to give 17α-methylandrosta-5,7-diene-3β,17β-diol melting at 206–212°.

(B) 5,8-epidioxy - 17α - methyl - 5α,8α - androst-6-ene-3β,17β-diol.—Oxygen is passed through a solution of 100 parts of 17α-methylandrosta - 5,7 - diene-3β,17β-diol and 1 part of eosin yellowish in 6500 parts of absolute ethyl alcohol while the solution is heated at the boiling point under reflux and illuminated by the light of a 500-watt tungsten lamp. After 8 hours, solvent is removed by vacuum distillation and the residue chromatographed on silica gel, using benzene and ethyl acetate as developing solvents. From an eluate comprising 5% ethyl acetate in benzene, on evaporation of solvent and recrystallization of the residue from a mixture of acetone and hexane, 5,8 - epidioxy - 17α - methyl - 5α,8α - androst-6-ene-3β, 17β-diol melting at 178–183° is obtained.

(C) 17β - hydroxy - 17α - methylandrosta - 4,6,8(14)-trien-3-one.—Substitution of 2 parts of 5,8-epidioxy-17α-methyl-5α,8α-androst-6-ene-3β,17β-diol for the 5,8-epidioxy-5α,8α-androst-6-ene-3β,17β-diol called for in Example 10D affords, by the procedure there detailed, 17β-hydroxy - 17α - methylandrosta - 4,6,8(14) - trien-3-one, having the formula

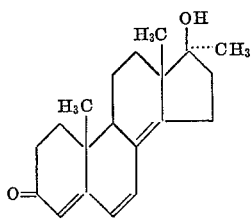

EXAMPLE 13

(A) 17α - ethynylandrosta - 5,7 - diene-3β,17β-diol.—Substitution of 100 parts of 3β-hydroxyandrosta-5,7-dien-17-one for the 3-methoxyestra-2,5(10),8(14)-trien-17-one called for in Example 8A affords, by the procedure there detailed, 17α-ethynylandrosta-5,7-diene-3β,17β-diol.

(B) 5,8 - epidioxy - 17α - ethynyl-5α,8α-androst-6-ene-3β,17β-diol.—Substitution of 100 parts of 17α-ethynylandrosta-5,7-diene-3β,17β-diol for the 17α-methylandrosta-5,7-diene-3β,17β-diol called for in Example 12B affords, by the procedure there detailed, 5,8-epidioxy-17α-ethynyl-5α,8α-androst-6-ene-3β,17β-diol.

(C) 17α - ethynyl - 17β - hydroxyandrosta - 4,6,8(14)-trien-3-one.—Substitution of 2 parts of 5,8-epidioxy-17α-ethynyl-5α,8α-androst-6-ene-3β,17β-diol for the 5,8-epidioxy-5α,8α-androst-6-ene-3β,17β-diol called for in Example 10D affords, by the procedure there detailed, 17α-ethynyl-17β-hydroxyandrosta - 4,6,8(14) - trien-3-one, having the formula

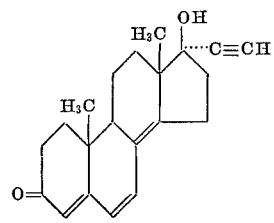

What is claimed is:
1. A compound selected from the group consisting of compounds of the formula

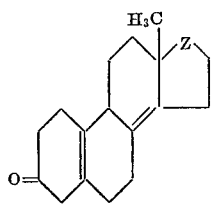

compounds of the formula

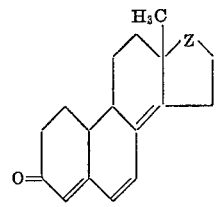

and compounds of the formula

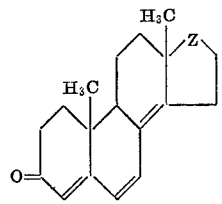

wherein Z represents carbonyl, β-hydroxymethylene, β-hydroxy-α-ethynylmethylene, or β-hydroxy-α-(lower alkyl) methylene.

2. A compound according to claim 1 which is 17β-hydroxy-17α-methylestra-4,8(14)-dien-3-one.

3. A compound according to claim 1 which is 17α-ethynyl-17β-hydroxyestra-4,8(14)-dien-3-one.

4. A compound according to claim 1 which is 17β-hydroxy-17α-methylestra-5(10),8(14)-dien-3-one.

5. A compound according to claim 1 which is 17β-hydroxyestra-4,6,8(14)-trien-3-one.

6. A compound according to claim 1 which is 17α-ethynyl-17β-hydroxyestra-4,6,8(14)-trien-3-one.

7. 5,8-epidioxy-3β-hydroxy-5α,8α-androst-6-en-17-one.

8. 5,8 - epidioxy-17α-methyl - 5α,8α - androst-6-ene-3β, 17β-diol.

9. 5,8-epidioxy-17α-ethynyl - 5α,8α - androst-6-ene-3β, 17β-diol.

10. A compound according to claim 1 having the formula

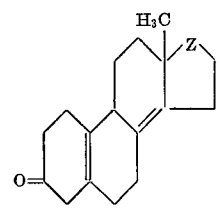

wherein Z represents carbonyl, β-hydroxymethylene, β-hydroxy-α-ethynylmethylene, or β-hydroxy-α-(lower alkyl) methylene.

11. A compound according to claim 1 having the formula

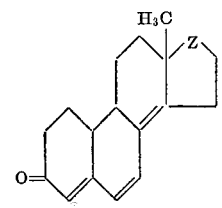

wherein Z represents carbonyl, β-hydroxymethylene, β-hydroxy-α-ethynylmethylene, or β-hydroxy-α-(lower alkyl) methylene.

12. A compound according to claim 1 having the formula
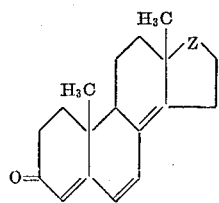
wherein Z represents carbonyl, β-hydroxymethylene, β-hydroxy-α-ethynylmethylene, or β-hydroxy-α-(lower alkyl) methylene.
References Cited
UNITED STATES PATENTS
3,365,473   1/1968   Taub _____ 260—397.3
OTHER REFERENCES
Miki et al., "Proc. Chem. Soc.," May 1963, page 139.
Johnston et al., "Steroids" (1966), page 366 relied on.
ELBERT L. ROBERTS, Primary Examiner
U.S. Cl. X.R.
260—397.3, 397.45, 999